United States Patent Office 3,562,247
Patented Feb. 9, 1971

3,562,247
MONOAZO DYES CONTAINING PHTHALIMIDES
Johannes Dehnert, Ludwigshafen (Rhine), Walter Grosch, Mannheim, and Gerhard Gnad, Ludwigshafen (Rhine), Germany, assignors to Badische Anilin- & Soda-Fabrik Aktiengesellschaft, Ludwigshafen (Rhine), Germany
No Drawing. Filed Sept. 11, 1968, Ser. No. 759,230
Claims priority, application Germany, Sept. 13, 1967,
P 16 44 068.9
Int. Cl. C09d 29/06
U.S. Cl. 260—152  6 Claims

ABSTRACT OF THE DISCLOSURE

Disperse dyes derived from aminophthalimides and 2-naphthylamine. They are especially useful for dyeing synthetic linear polyamides.

This invention relates to monoazo dyes having the general Formula I:

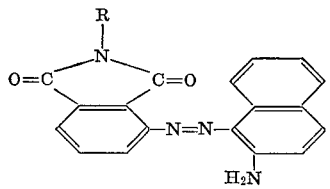

in which R denotes a hydroxyalkyl radical.

Examples of the radical R are: β-hydroxyethyl, β-hydroxypropyl, γ-hydroxypropyl, β-hydroxy-α,α-dimethylethyl and ω-hydroxyhexyl.

The new dyes which have no sulfonic acid groups give scarlet dyeings on hydrophobic synthetic fibers; the dyeings have very good fastness properties, particularly on synthetic polyamides such as nylon 6 or nylon 6,6. Mixtures of the new dyes may also be used with advantage for dyeing. The dyes can also be used for dyeing polyamide fibers in admixture with other synthetic or marked fibers.

The said dyes having the Formula I can be prepared by reacting a diazo compound of an amine having the general Formula II:

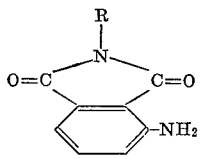

with 2-naphthylamine or 2-naphthylamine-1-sulfonic acid. The sulfonic acid groups is dislodged during the coupling.

Amines having the Formula II may be diazotized by conventional methods, for example in the presence of dilute hydrochloric acid or sulfuric acid in water or in mixtures of water and organic solvents, with or without the addition of dispersing agents. Coupling takes place in the acid pH range.

Dyes having diazo components having the Formula II which are particularly suitable for dyeing polyesters are known from French patent specification No. 1,358,145. It is surprising that specifically the dyes having the Formula I should give dyeings having excellent fastness properties on polyamides.

The invention is illustrated by the following examples in which the parts and percentages are by weight unless otherwise specified.

EXAMPLE 1

20.6 parts of 3-aminophthalic acid-β-hydroxyethylimide is stirred for one hour with 200 parts of water and 25 parts by volume of concentrated hydrochloric acid. 100 parts of ice is added and at 0° to 5° C. 30 parts by volume of 23% sodium nitrite solution is slowly added. The whole is stirred at the same temperature for another two hours and any excess of nitrous acid is removed in the usual way. A solution of the sodium salt of 24 parts of 2-aminonaphthalene-1-sulfonic acid in 200 parts by volume of water is gradually added to the solution of the diazonium salt. A pH volume of 4 is then set up by adding a 50% aqueous sodium acetate solution. After coupling is over, the dye, which has the formula

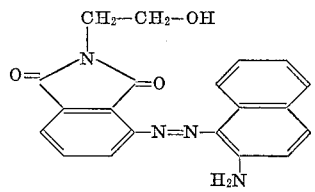

is suction filtered, washed with water and dried at 70° C. A dark red powder is obtained which dissolves in acetone giving a red coloration and produces on polyamide cloth scarlet dyeings which have excellent fastness properties. Polyethylene terephthalate cloth is also dyed scarlet shades.

EXAMPLE 2

22 parts of 3-aminophthalic acid-γ-hydroxypropylimide together wtih 300 parts of water and 0.5 part of the reaction product of oleylamine with about 12 moles of ethylene oxide are stirred for several hours at room temperature. After 25 parts by volume of concentrated hydrochloric acid and 200 parts of ice have been added, 30 parts by volume of 23% sodium nitrite solution is allowed to flow in slowly at 0° to 5° C. The whole is stirred at the same temperature for another two hours and then coupled with 24 parts of 2-aminonaphthalene-1-sulfonic acid as described in Example 1. A red powder is obtained which dissolves in acetone with a red coloration and dyes polyamide fibers scarlet shades having very good fastness properties.

EXAMPLE 3

22 parts of 3-aminophthalic acid-β-hydroxypropylimide is diazotized in a manner analogous to that in Example 2. A solution of 14.4 parts of 2-naphthylamine and 10 parts by volume of concentrated hydrochloric acid in 400 parts by volume of water is gradually added to the solution of the diazonium salt. A pH value of 4 to 5 is then set up by adding a 50% aqueous sodium acetate solution. After coupling is over, the dye is worked up as usual.

EXAMPLE 4

30 parts by volume of 23% sodium nitrite solution is allowed to flow slowly at 0° to 5° C. while stirring into a solution of 26.2 parts of 3-aminophthalic acid-ω-hydroxyhexylimide in 350 parts by volume of glacial acetic acid and 24 parts by volume of concentrated hydrochloric acid. A little ice is added during the addition of the sodium nitrite solution. The whole is stirred for another two hours at the same temperature, any excess of nitrous acid present is removed and a pH value of 4 is set up by adding a 50% aqueous solution of sodium acetate. Then a solution of the sodium salt of 24 parts of 2-aminonaphthalene-1-sulfonic acid in 200 parts by volume of water is slowly added, the temperature being kept at 0° to 5°

C. by external cooling and if necessary by adding ice. When the coupling is over, the dye, which has the formula:

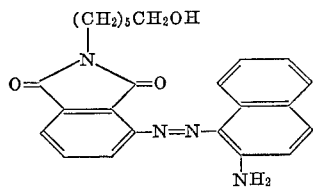

is isolated in the usual way and dried at 70° C. It is a red powder which dissolves in acetone giving a red coloration and dyes polyamide cloth scarlet shades having outstanding fastness to light and washing.

EXAMPLE 5

22.6 parts of 3-aminophthalic acid-α,α-dimethyl-β-hydroxyethylimide is coupled with 24 parts of 2-aminonaphthalene-1-sulfonic acid in a manner analogous to that in Example 4. The resultant red dye dyes polyamide cloth scarlet shades having excellent fastness properties.

EXAMPLE 6

A mixture of 6.9 parts of 3-aminophthalic acid-β-hydroxyethylimide, 7.3 parts of 3-aminophthalic acid-β-hydroxypropylimide and 7.3 parts of 3-aminophthalic acid-γ-hydroxypropylimide is diazotized analogous to that in Example 2 and coupled with 24 parts of 2-aminonaphthalene-1-sulfonic acid. The dye mixture formed dyes polyamides cloth full scarlet shades having outstanding fastness properties.

EXAMPLE 7

A mixture of 7.3 parts of 3-aminophthalic acid-β-hydroxypropylimide, 7.3 parts of 3-aminophthalic acid-γ-hydroxypropylimide and 8.7 parts of 3-aminophthalic acid-ω-hydroxyhexylimide is diazotized in a manner analogous to that in Example 4 and coupled with 24 parts of 2-aminonaphthalene-1-sulfonic acid. A dye mixture is obtained which gives scarlet dyeings having very good light and wet fastness on polyamide cloth.

We claim:
1. A monoazo dye having the formula:

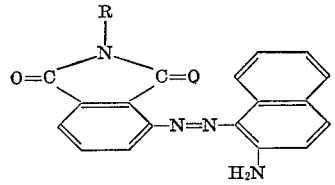

in which R denotes hydroxyalkyl of 2 to 6 carbon atoms.

2. The dye having the formula given in claim 1 in which R denotes β-hydroxyethyl.

3. The dye having the formula given in claim 1 in which R denotes β-hydroxypropyl.

4. The dye having the formula given in claim 1 in which R denotes γ-hydroxypropyl.

5. The dye having the formula given in claim 1 in which R denotes β-hydroxy-α,α-dimethylethyl.

6. The dye having the formula given in claim 1 in which R denotes ω-hydroxyhexyl.

References Cited

FOREIGN PATENTS

| 828,769 | 5/1938 | France | 260—152 |
| 1,358,145 | 3/1964 | France | 260—152 |

CHARLES B. PARKER, Primary Examiner

D. M. PAPUGA, Assistant Examiner

U.S. Cl. X.R.

8—41, 55